United States Patent

Nakayasu et al.

Patent Number: 5,558,144
Date of Patent: Sep. 24, 1996

[54] PNEUMATIC RADIAL TIRE WITH HYBRID BAND CORD

[75] Inventors: Ritsuo Nakayasu, Osaka; Shinichi Miyazaki, Kobe, both of Japan

[73] Assignee: Sumitomo Rubber Industries, Ltd., Hyogo-ken, Japan

[21] Appl. No.: 365,114

[22] Filed: Dec. 28, 1994

[30] Foreign Application Priority Data

Dec. 28, 1993 [JP] Japan .................................. 5-338099

[51] Int. Cl.$^6$ .................. B60C 9/18; B60C 9/20
[52] U.S. Cl. .................. 152/527; 152/526; 152/531; 152/533
[58] Field of Search .................. 152/526–527, 152/531, 533

[56] References Cited

U.S. PATENT DOCUMENTS

| | | |
|---|---|---|
| 4,957,799 | 9/1990 | Miyamoto et al. . |
| 5,373,885 | 12/1994 | Yamashita ............... 152/531 X |
| 5,419,383 | 5/1995 | Iwamura ............... 152/531 X |
| 5,436,076 | 7/1995 | Nakata et al. ............... 152/531 X |

FOREIGN PATENT DOCUMENTS

| | | |
|---|---|---|
| 0335588 | 10/1989 | European Pat. Off. . |
| 0360588 | 3/1990 | European Pat. Off. . |
| 0454432 | 10/1991 | European Pat. Off. . |

OTHER PUBLICATIONS

Patent Abstracts of Japan; vol. 16 No. 103; 13 Mar. 1992 & JP–A–03 279004 (Ohtsu Tire & Rubber Co., Ltd); 10 Dec. 1991.

*Primary Examiner*—Adrienne C. Johnstone
*Attorney, Agent, or Firm*—Birch, Stewart, Kolasch & Birch, LLP

[57] ABSTRACT

A pneumatic radial tire containing a non-metallic cord breaker belt disposed radially outside a carcass, and a jointless band belt disposed radially outside the breaker belt, said band belt being made of at least one hybrid cord wound spirally and continuously in the circumferential direction of the tire at an angle of 0 to 3 degrees with respect to the tire equator. The hybrid cord includes a low elastic modulus thread and a high elastic modulus thread which are finally-twisted together, said low modulus thread having at least one low modulus fiber, first-twisted and having an elastic modulus of not more than 2000 kgf/sq.mm and said high modulus thread having at least one high modulus fiber first-twisted and having an elastic modulus of not less than 3000 kgf/sq.mm. In the band belt ply, the count (E) of the hybrid cord per 5 cm width, the stress (F1) in kgf of the hybrid cord at 2% elongation, and the stress (F2) in kgf of the hybrid cord at 6% elongation satisfies the following relationships: $F1 \times E < 60$; and $F2 \times E > 150$.

8 Claims, 4 Drawing Sheets

PNEUMATIC RADIAL TIRE WITH HYBRID BAND CORD

BACKGROUND OF THE INVENTION

The present invention relates to a pneumatic radial tire, in which a reduction of the tire weight can be achieved, while maintaining the steering stability and the high speed running performance of the tire. This is achieved by preventing the tread portion from being cut and the tread groove bottoms from cracking caused during running.

Recently, from the point of view of preservation of the earth environment, energy-saving and the like, there is a great demand for vehicles whose fuel consumption is reduced. With respect to vehicle tires, it is necessary to reduce the tire weight.

Hitherto, in order to reduce the weight of a radial tire, it is known to make a tire belt from high elastic modulus organic fiber cords instead of steel cords. Aromatic polyamide fiber cords (hereinafter aramid cords) are typical thereof.

On the other hand, in a radial tire for high speed and heavy load use, in order to prevent the belt from being lifted during running, a so called jointless band belt (hereinafter JLB belt) is provided outside the breaker belt. The JLB belt is formed by winding a long narrow strip spirally and continuously in the tire circumferential direction.

In a tire having the above-mentioned construction, as the inner pressure increases, the bottoms of the tread grooves are subjected to a large stress, and tile groove bottoms are liable to crack during running. Therefore, the tire durability tends to decrease. When the tire is demolded, after vulcanization, the belt layer contracts radially to decrease its diameter, and the radius of curvature of the tread portion is greatly altered from the radius of curvature of the mold. If priority is given to the hoop effect for preventing lifting during running, it becomes hard to press the raw cover tire onto the mold impression during vulcanization, and as a result, the molding becomes inferior.

As a method for solving this problem, a JLB structure is disclosed in Japanese Patent application laid open No. 1-247204, in which a hybrid cord made of a high elastic modulus fiber strand (hereinafter high elastic modulus thread) and a low elastic modulus fiber strand (hereinafter low elastic modulus thread) is used. In this method, if non-metallic cords are used in the belt to reduce the weight, the problem of the tire contraction during vulcanization also arises. That is, as the belt has less pull-resistance, when the tire inner pressure is increased during vulcanization, the tire inflates and the band is elongated. As a result, the molding is superior. When the inner pressure is decreased after vulcanization, the cords return to almost the length as the original length while leaving a small permanent elongation (set). As the rubber accompanies such elongation and contraction, the diameter of the tire is increased when the tire is inflated with air. This means that the tread rubber is in an elongated state, in which the cut resistance of the tread rubber and crack resistance of the tread groove are decreased.

In Japanese patent application laid open No. 3-279004, an invention was disclosed in which a hybrid cord is used to decrease the shear between belt plies, while maintaining fitness to the vulcanizing mold. In this application, for example FIG. 2 shows that the band which is a belt reinforcing layer is not limited to only a JLB, and the stress at 6% elongation is 1 to 1.5 kgf.

Therefore, if the cord count is set at a usual level of about 50, the product of the stress and cord count is about 50 to 70 kgf.

In Japanese patent application laid open No. 4-169304, an invention was disclosed in which the quantity of the steel cords in a steel cord belt layer was properly reduced by using a JLB made of hybrid cords. However, there was no disclosure about the above-mentioned cut resistance and crack resistance.

In Japanese patent application laid open Nos. 4-8605 and 4-356205, a band made of a ribbon of rubberized parallel hybrid cords (hereinafter hybrid band) is disclosed. While there is no disclosure about the twist number for the hybrid cord, the stress at 3% elongation is described as being not more than 2.5 g/d. Further, it is explained that when less than 1 g/d, it is difficult to manufacture such a cord.

In British patent 2,064,445, the stress-elongation curves of various cords are shown in FIG. 3, wherein a 3×7 metallic cord displays a low stress of up to about 6% elongation, but when the elongation exceeds this value, the stress increases abruptly. In the disclosed invention, such a cord is used in a belt edge band, but two or more breaker belts made of metallic cords are provided. Therefore, it is not a structure intended to reduce the weight.

In a pneumatic radial tire, when non-metallic cords are used in its belt instead of steel cords to achieve a weight reduction while maintaining high speed durability and steering stability, the belt is required to be improved in the hoop effect to prevent lifting during high speed running, while displaying a proper elongation during vulcanization, which allows an easy inflation of the tire to fit the mold.

Even if both the requirements are satisfied, when elongation during vulcanization and hoop effect are such that the change in the tire diameter due to the margin of tire contraction is large, there is a problem that the tread portion is inferior in the cut resistance and crack resistance.

SUMMARY OF THE INVENTION

It is therefor, an object of the present invention to improve the total quality of a tire by solving the above-mentioned problems while satisfying recent requirements for the high speed running performance and weight reduction.

According to one aspect of the present invention, a pneumatic radial tire comprises
  a tread portion,
  a sidewall portion extending radially inwardly from each tread edge,
  a bead portion located at the radially inner end of the sidewall portion,
  a carcass ply of radially arranged cords extending through the tread portion and sidewall portions and turned up around a bead core in each bead portion from the inside to outside of the tire to be secured thereto,
  a breaker belt disposed radially outside the carcass ply,
  a band belt disposed radially outside the breaker belt,
  the breaker belt comprising at least one ply of non-metallic cords,
  the band belt comprising a ply of at least one hybrid cord wound spirally and continuously in the circumferential direction of the tire at an angle of 0 to 3 degrees with respect to the tire equator,
  the hybrid cord comprising a low elastic modulus thread and a high elastic modulus thread which are finally-twisted together, the low elastic modulus thread comprising a low elastic modulus fiber having an elastic modulus of not more than 2000 kgf/sq.mm and first-twisted, the high elastic modulus thread comprising a high elastic modulus fiber having an elastic modulus of not less than 3000 kgf/sq.mm and first-twisted, and in the band belt ply, the count (E) for the hybrid cord per 5 cm width, the stress (F1) in kgf of the hybrid cord at 2% elongation, and the stress (F2) in kgf of the hybrid cord at 6% elongation satisfies the following relationships:

$F1 \times E < 60$; and $F2 \times E > 150$.

For the low elastic modulus fiber, nylon fibre, polyester fiber and the like can be used. On the other hand, for the high elastic modulus fiber, aromatic polyamide fiber, polyvinyl alcohol fibre, carbon fiber, glass fiber and the like can be used. However, the combination of the low modulus nylon fiber and high modulus aromatic polyamide fiber is suitably used in view of the balance of the stress between the elongation range of under 6% and that of over 6%.

In the present invention, by improving and specifically defining the cord construction and twist, it became possible to manufacture a cord having a stress of less than 1 g/denier, whereas the above-mentioned Japanese patent application laid open Nos. 4-8605 and 4-356205 explained such a hybrid cord as difficult to manufacture. Therefore, the drawback of the conventional hybrid cord can be eliminated and the present invention is accomplished.

Accordingly, tile tire weight is reduced because a non-metallic belt is used. Further, the hoop effect is improved and lifting during high speed running is prevented because a JLB belt is used. Furthermore, the band has no Joint, which generates less vibrations, and the band has excellent durability.

When a non-metallic belt is used, the belt rigidity tends to become insufficient. However, such a loss of belt rigidity can be compensated by the use of a hybrid band made of a high elastic modulus thread and a low elastic modulus thread twisted together.

Further, the rigidity can be increased by decreasing the final-twist by decreasing the first-twist for the high elastic modulus thread and also by providing an extensibility for the hybrid cord through an adhesion process and heating process therefor.

In the hybrid cord, by setting the thickness of the low elastic modulus thread at not more than ½ of the thickness of the high elastic modulus thread, and by setting the first-twist of the low elastic modulus thread at not more than ½ of the final-twist number, the product of the stress (kgf) of the hybrid cord at 2% elongation multiplied by the cord count is set at less than 60. Therefore, the cord can be easily elongated by a small load corresponding to the inner pressure at the time of vulcanization.

Further, an elastic modulus required under heavy load can be maintained by setting the product of the stress (kgf) at 6% elongation (corresponding to the inner pressure in actual service conditions) multiplied by the cord count at more than 150.

Given that cords are arranged in a certain direction in parallel with each other, the above-mentioned cord count is the number of cords counted in the arranging direction in a unit width (5 cm width in the present invention).

Since the cord having special elongation characteristics is used in the hybrid band, the band is expanded during vulcanization, where the expansion corresponds to the diameter difference between the raw tire and the mold. After vulcanization, the elongation stress of the band decreases the tire diameter. In the present invention, however, because the band is designed to show a small stress at the time of vulcanization, a decrease in the diameter is limited to a small percentage.

Incidentally, if a steel cord is used in the belt, since the rigidity is higher than the non-metallic cords, the diameter is hardly decreased, but the tire weight increases.

If the change in the tire diameter is large, the tensile stress by the application of inner pressure in actual service conditions causes a stress concentration, and as a result, cracks in the tread groove and cuts in the tread portion are caused by repeated deformation and injuries by objects.

The present invention therefore, provides a pneumatic radial tire in which, by decreasing the change in the tire diameter, the durability is improved and the total tire performance is greatly improved.

BRIEF DESCRIPTION OF THE DRAWINGS

The present invention will now be described in conjunction with the drawings, wherein.

DETAILED DESCRIPTION OF THE INVENTION

Figure 1:
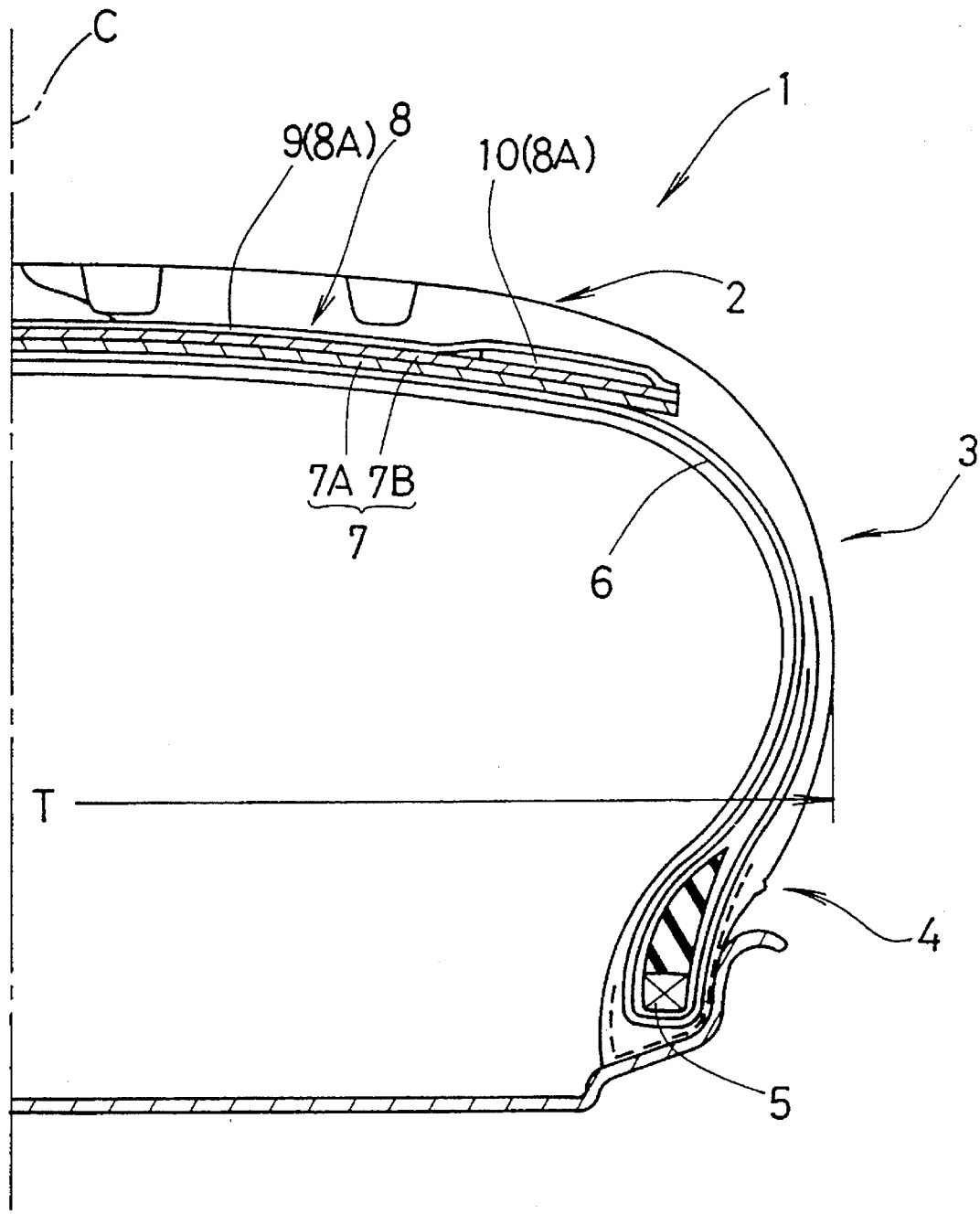
FIG. 1 is a cross sectional view of an embodiment of the present invention.

In FIG. 1, the pneumatic radial tire 1 comprises a tread portion 2, a sidewall portion 3 extending radially inwardly from each edge of the tread portion 2, a bead portion 4 located at the radially inner end of each of the sidewall portions 3, a bead core 5 disposed in each of the bead portions 4, a toroidal carcass 6 of which both edges are turned up around the bead cores 5 in the bead portions 4, a breaker belt 7 disposed radially outside the carcass 6 in the tread portion 2, and a band belt 8 disposed radially outside the breaker belt 7.

The carcass 6 comprises at least one ply of cords arranged radially at an angle of form 60 to 90 degrees with respect to the tire equator C.

The breaker belt 7 in this embodiment comprises two plies 7A and 7B of aramid fiber cords, wherein the cords in each of the plies 7A and 7B are laid parallel with each other but crosswise to the cords in the next ply.

The band belt 8 in this embodiment comprises a pair of edge bands 10 each covering each edge portion of the breaker belt 7 and a main band 9 disposed radially outside thereof covering the substantially full width of the breaker belt 7 including the edge bands.

Figure 6:
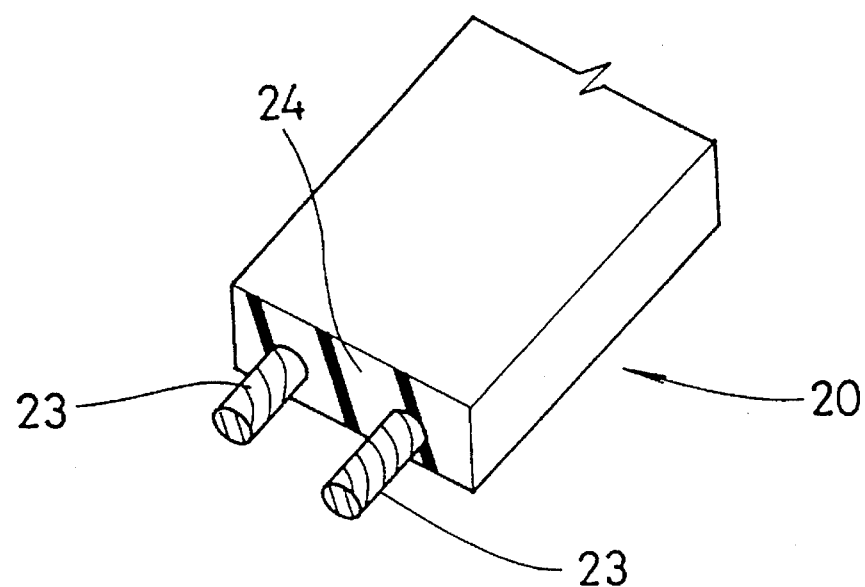
FIG. 6 is a perspective view of a narrow strip used to form the band belt ply.
Figure 7:
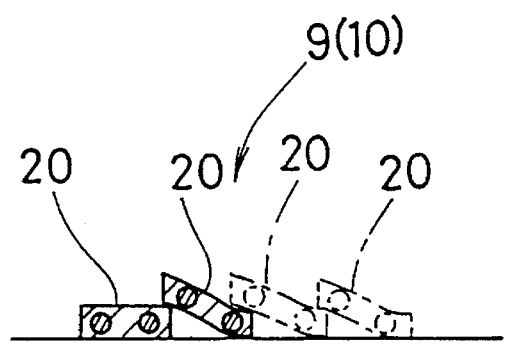
FIG. 7 is a cross sectional view explaining a method of winding the narrow strip.

Each of the main band 9 and edge bands 10 is a JLB ply 8A made of at least one hybrid cord wound spirally and continuously in the circumferential direction of the tire at an angle of from 0 to 3 degrees with respect to the tire equator. In this embodiment, the JLB ply 8A is formed by spirally winding at least one long narrow strip 20 around the outer surface of the breaker belt 7. In the narrow strip 20, as shown in FIG. 6, hybrid cords 23 are coated with a topping rubber 24 in a form of a ribbon.

Figure 4:
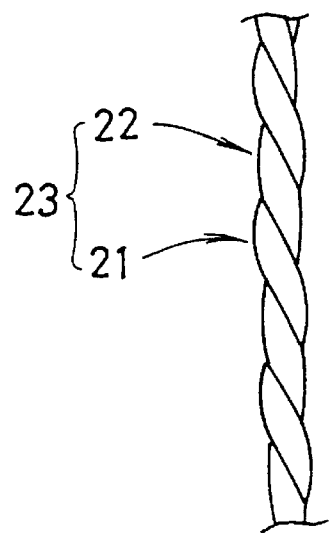
FIG. 4 is an exterior view of hybrid cord No. 2.
Figure 5:
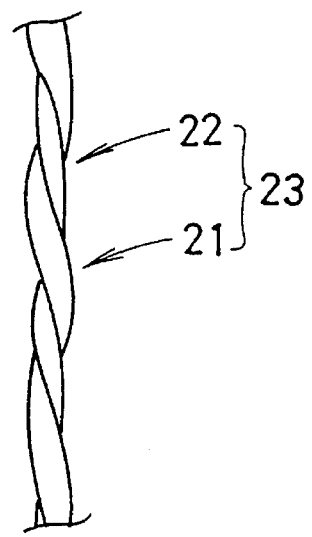
FIG. 5 is an exterior view of hybrid cord No. 6.

As shown in FIG. 4 and FIG. 5, the hybrid cord 23 comprises at least one high elastic modulus thread 21 and at least one low elastic modulus thread 22 which are twisted together. The high elastic modulus thread 21 is made of high elastic modulus fiber, and the low elastic modulus thread 22 is made of low elastic modulus fiber.

The high elastic modulus fiber has an elastic modulus of not less than 3000 kgf/sq.mm, preferably not less than 5000 kgf/sq.mm. Preferably, aramid fiber is used, but polyvinyl alcohol fiber having a strength of not less than 15 g/d, carbon fiber, glass fiber and the like may be used. If the elastic modulus of the high elastic modulus fibre is lower than 3000 kgf/sq.mm, a sufficient hoop effect can not be obtained, and the prevention of lifting during high speed running becomes insufficient.

The low elastic modulus fiber has an elastic modulus of not more than 2000 kgf/sq.mm, preferably not more than 1000 kgf/sq.mm. Preferably, aliphatic polyamide fiber, i.e. nylon fiber is used.

To form a high elastic modulus thread 21, one or more aramid fibers are first-twisted together in a certain direction. Similarly, to form a low elastic modulus thread 22, one or more nylon fibers are first-twisted together in the same direction as the aramid fibers. Then, those threads 21 and 22 are finally-twisted together in the reverse direction to the first-twist so as to form a hybrid cord 23. Therefore, in such hybrid cord, the first-twisted threads are twisted back by the turns corresponding to the final-twist. When such a hybrid cord 23 is loaded, in the initial stage of the elongation, the cord is easily elongated with a very small stress, since the spiral twist of the hybrid cord 23 is first twisted back. However, when the elongation reaches to a specific value, a larger load is required to elongate it since the elongation is mainly resisted by the elastic modulus of each fiber.

Figure 2:
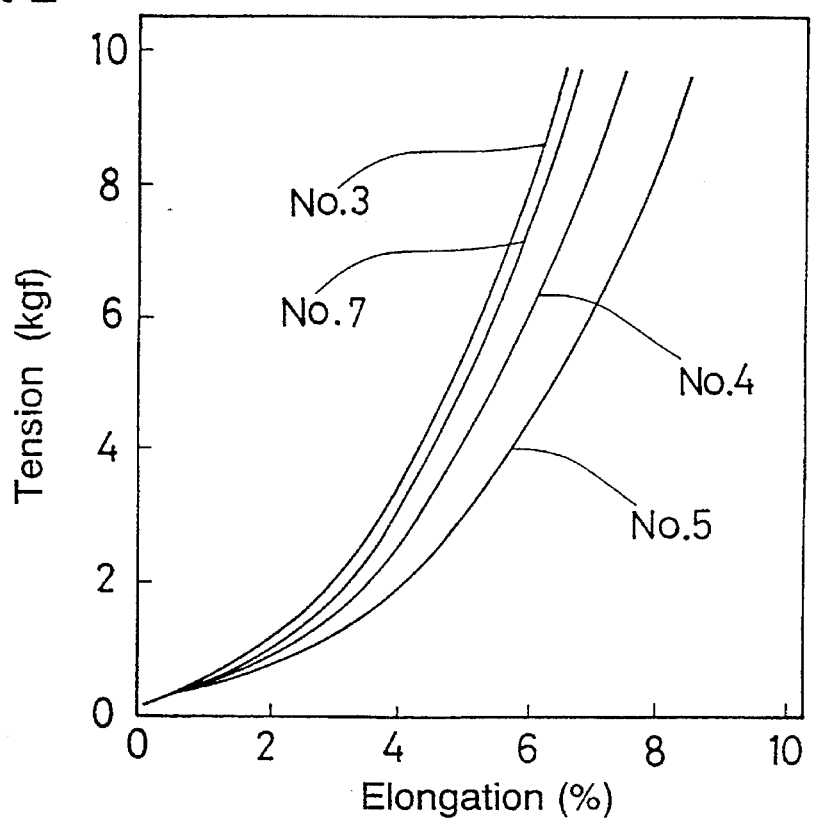
FIGS. 2 and 3 are graphs showing the stress-elongation curves of the cords used in test tires.
Figure 3:
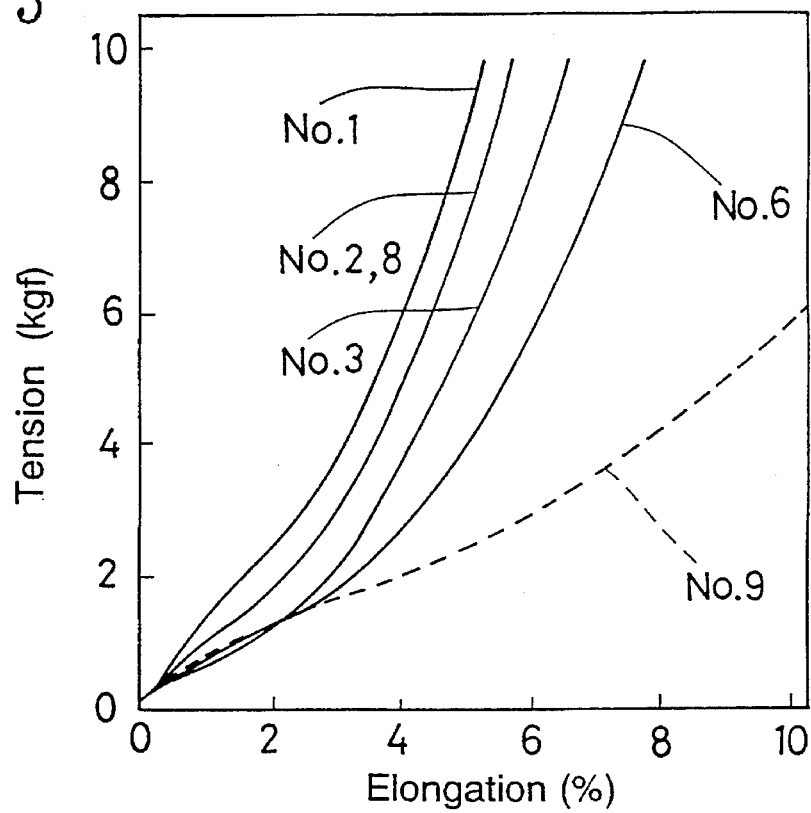

Table 1 shows the specifications of test tires. The test tires had a tire size of 205/60R14 and the same tire construction shown in FIG. 1 except for the cords used in the JLB belt. The stress-elongation curves of the cords used in the JLB belt are shown in FIG. 2 and FIG. 3, and the specifications thereof are also shown in Table 1.

In Table 1, the "Tire diameter change" was the difference between the diameter at an inner pressure of 0.1 kgf/sq.cm and that at 2.0 kgf/sq.cm.

The "Cut open width" was the maximum width of the opening of a cut, when thee bottom of a tread main groove was cut with a knife by a length of 8 mm along the groove and a depth of 2 mm under a state that the test tire was not inflated, and then the tire was inflated to the regulated maximum inner pressure.

The "Crack resistance" was that, using a drum tester, the test tire inflated to 1.9 kgf/sq.cm and loaded with 580 kgf (the maximum load to the approved maximum air pressure) was run for 30,000 kilometers at a speed of 80 kilometer/hour, with blowing air including 80 pphm ozone against the tire. And the running distance until the bottom of the main grooves was cracked at at least five positions per one groove was measured. The larger the running distance, the higher the resistance.

The "Steering stability" was an evaluation into five ranks made by a driver who run a test car provided with the test tires in a test course. The larger the value, the better the stability.

The stress-elongation curve 1 is of cord No.1 in Table 1, which is a hybrid cord made of a high elastic modulus thread of 1000 denier aramid fibers first-twisted 42 turns/10 cm and a low elastic modulus thread of 1260 denier nylon-66 fibers first-twisted 24.5 turns/10 cm, which are finally-twisted 37.5 turns/10 cm.

The curve 2 is of cord No. 2 which is a hybrid cord made of a high elastic modulus thread of 1000 denier aramid fibers first-twisted 42 turns/10 cm and a low elastic modulus thread of 840 denier nylon fiber first-twisted 30 turns/10 cm, which are finally-twisted 42 turns/10 cm.

In the JLB belt, the count (E) for the hybrid cord was 50/5 cm.

In the test tires 1 and 2, therefore, the product (F1×E) of the stress (F1) of the hybrid cord at 2% elongation multiplied by the cord count (E) was set at a rather high value such as 120 (tire 1) and 85 (tire 2). As the decrease in the tire diameter was large, tread groove cracks were found at more than five positions per one tread groove after running for 25,000 kilometers.

The stress-elongation curve 3 is of hybrid cord 3 in Table 1, in which the thickness of the low elastic modulus thread was 420 denier, the first-twist was 42.4 turns/10 cm, and the final-twist was 47.8 turns/10 cm. Accordingly, the apparent difference in the twist number is 5.8 turns/10 cm in the direction of the final-twist of the high elastic modulus thread and 5.4 turns/10 cm in the direction of the final-twist of the low elastic modulus thread. In this tire 3, the product F1×E of the stress F1 at 2 elongation and the cord count E was 55. The tread groove cracks found after 30,000 kilometer running was at less than five positions.

The stress-elongation curve 4 is of hybrid cord 4, in which the first-twist of the low elastic modulus thread was 20 turns/10 cm which was smaller than ½ of the final-twist of 47.8 turns/10 cm. In this tire 4, the product F1×E of the stress F1 at 2 elongation and the cord count E was 40, and the product F2×E of the stress F2 at 6% elongation and the cord count E was 295. No tread groove crack was found even after running for 30,000 kilometers.

The stress-elongation curve 6 is of hybrid cord 6, in which the high elastic modulus thread was 1000 denier, and the low elastic modulus thread was 840 denier. In this tire 6, the product F1×E and F2×E were 60 and 280, respectively. After running for 30,000 kilometers, only slight cracks were found.

The stress-elongation curve 7 is of hybrid cord 7, in which the low elastic modulus thread was 420 denier which was smaller than ½ of the high elastic modulus thread. In this tire 7, no crack was found to occurr.

The curve 8 is of hybrid cord 8 in Table 8. In the tire 8, steel cords were used in the breaker belt instead of aramid cords. The tire diameter change was therefore small, and no crack was found to occur, but a tire weight reduction was not achieved.

The stress-elongation curve 9 is of cord 9 which was made of two twisted 1260 denier low elastic modulus threads. In this tire 9, as the JLB belt was made 0f such low elastic modulus cords, the diameter change was large, but as the belt rigidity was found to low, no crack was occurr. Therefore, the tire lacked the hoop effect during high speed running and steering stability.

As explained above, in the tire manufacturing process, it becomes possible to press the raw tire into the impression of the mold by increasing the inner pressure of the tire. In the finished tire, by using the high elastic modulus thread in the band belt, tire expansion produced by high speed running is decreased, and the tire diameter change in the tire manufacturing process is also decreased. Accordingly, the occurrence of tread groove bottom cracks cause by high speed running can be prevented. Therefore, it is possible to provide a light-weight tire having excellent high speed durability. Further, as the JLB belt in the present invention is spirally wound, there is no splice, and the tire is provided with uniformity in the circumferential direction. Therefore, vibrations during running become decreased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

elastic modulus of not less than 3000 kgf/sq.mm, wherein, in the band belt ply, the count E of the at least one hybrid cord per 5 cm width, the stress F1 in kgf of each at least one hybrid cord at 2% elongation, and the stress F2 in kgf of each at least one hybrid cord at 6% elongation satisfies the following relationships:

$F1 \times E < 60$; and $F2 \times E > 150$.

TABLE 1

| Tire No. | 1<br>Ref. A | 2<br>Ref. B | 3<br>Ex. A | 4<br>Ex. B | 5<br>Ex. C | 6<br>Ref. C | 7<br>Ex. D | 8<br>Ref. D | 9<br>Ref. E |
|---|---|---|---|---|---|---|---|---|---|
| Band belt Code No. | 1 | 2 | 3 | 4 | 5 | 6 | 7 | 8 | 9 |
| Material |  |  |  |  |  |  |  |  |  |
| High modulus thread | aramid 1000D | aramid 1000D | aramid 1000D | aramid 1000D | aramid 1000D | aramid 1000D | aramid 1000D | aramid 1000D | — |
| Low modulus thread | nylon 1260D | nylon 840D | nylon 420D | nylon 420D | nylon 420D | nylon 840D | nylon 420D | nylon 840D | nylon 1260Dx2 |
| First-twist (T/10 cm) |  |  |  |  |  |  |  |  |  |
| High modulus thread | 42.0 | 42.0 | 42.0 | 42.0 | 42.0 | 42.0 | 30.0 | 42.0 | — |
| Low modulus thread | 24.5 | 30.0 | 42.4 | 20.0 | 6.0 | 10.0 | 6.0 | 30.0 | 40.0 |
| Final-twist (T/10 cm) | 37.5 | 42.0 | 47.8 | 47.8 | 47.8 | 42.0 | 47.8 | 42.0 | 40.0 |
| Stress (kgf) |  |  |  |  |  |  |  |  |  |
| F1 at 2% elongation | 2.4 | 1.7 | 1.1 | 0.8 | 0.6 | 1.2 | 0.9 | 1.7 | 1.3 |
| F2 at 6% elongation | 12.0 | 10.5 | 8.0 | 5.9 | 4.5 | 5.6 | 7.6 | 10.5 | 3.0 |
| Cord count E (/5 cm) | 50 | 50 | 50 | 50 | 50 | 50 | 50 | 50 | 50 |
| F1 × E (kgf) | 120 | 85 | 55 | 40 | 30 | 60 | 45 | 85 | 65 |
| F2 × E (kgf) | 600 | 525 | 400 | 295 | 225 | 280 | 380 | 525 | 150 |
| Breaker cord material | aramid | aramid | aramid | aramid | aramid | aramid | aramid | steel | aramid |
| Test results |  |  |  |  |  |  |  |  |  |
| Diameter change (mm) | 11.4 | 9.5 | 6.1 | 4.5 | 3.4 | 6.7 | 4.9 | 1.9 | 7.2 |
| Cut open width (mm) | 0.38 | 0.32 | 0.30 | 0.28 | 0.27 | 0.29 | 0.29 | 0.25 | 0.31 |
| Crack resistance |  |  |  |  |  |  |  |  |  |
| Cracks | occurred | occurred | slight | non | non | slight | non | non | non |
| Running distance (km) | 25,000 | 25,000 | 30,000 | 30,000 | 30,000 | 30,000 | 30,000 | 30,000 | 30,000 |
| Steering stability | 3.2 | 3.0 | 2.9 | 2.7 | 2.7 | 2.8 | 2.9 | 3.2 | 2.5 |

We claim:

1. A pneumatic radial tire comprising
a toroidal carcass ply,
a breaker belt disposed radially outside the carcass ply, and
a band belt disposed radially outside the breaker belt,
the breaker belt comprising at least one ply of parallel, non-metallic cords,
the band belt comprising a ply of at least one hybrid cord wound spirally and continuously in the circumferential direction of the tire at an angle of 0 to 3 degrees with respect to the tire equator,
the at least one hybrid cord each comprising a low elastic modulus thread and a high elastic modulus thread which are finally-twisted together,
the low elastic modulus thread comprising at least one low elastic modulus fiber first-twisted and having an elastic modulus of not more than 2000 kgf/sq.mm, and
the high elastic modulus thread comprising at least one high elastic modulus fiber first-twisted and having an 2. The pneumatic radial tire of claim 1, wherein the thickness (d1) in denier of the low elastic modulus thread is not more than ½ of the thickness (d2) in denier of the high elastic modulus thread.

3. The pneumatic radial tire of claim 1, wherein the first-twist (t1) of the low elastic modulus thread is not more than ½ of the final-twist (t0) of each at least one hybrid cord.

4. The pneumatic radial tire of claim 1, wherein the thickness (d1) in denier of the low elastic modulus thread is not more than ½ of the thickness (d2) in denier of the high elastic modulus thread, and the first-twist (t1) of the low elastic modulus thread is not more than ½ of each at least one final-twist (t0) of the hybrid cord.

5. The pneumatic radial tire of claim 1, 2, 3 or 4, wherein the at least one low elastic modulus fiber has an elastic modulus of not more than 1000 kgf/sq.mm, and the at least one high elastic modulus fiber has an elastic modulus of not less than 5000 kgf/sq.mm.

6. The pneumatic radial tire of claim 1, 2, 3 or 4, wherein the product E×F1 of the cord count E and the stress F1 (kgf) at 2% elongation of each at least one hybrid cord is not more than 45, and the product E×F2 of the cord count E and the stress F2 (kgf) at 6% elongation of each at least one hybrid cord is not less than 200.

7. The pneumatic radial tire of claim 2, 3 or 4, wherein each at least one hybrid cord consists of one said low elastic modulus thread and one said high elastic modulus thread which are finally-twisted together.

8. The pneumatic radial tire of claim 1, 2, 3 or 4, wherein the at least one low elastic modulus fiber is made of nylon fiber, and the at least one high elastic modulus fiber is made of aromatic polyamide fiber.

* * * * *